(12) United States Patent
Clevorn et al.

(10) Patent No.: US 8,718,585 B2
(45) Date of Patent: May 6, 2014

(54) METHOD AND DEVICE FOR RADIO COMMUNICATION

(75) Inventors: Thorsten Clevorn, Duesseldorf (DE); Juergen Niederholz, Geldern (DE); Frank Gersemsky, Recklinghausen (DE); Herbert Dawid, Aachen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 635 days.

(21) Appl. No.: 12/270,962

(22) Filed: Nov. 14, 2008

(65) Prior Publication Data

US 2010/0124893 A1 May 20, 2010

(51) Int. Cl.
*H04B 17/00* (2006.01)
(52) U.S. Cl.
USPC ....... 455/226.3; 455/63.1; 455/522; 455/501; 455/13.4; 455/135; 455/161.3; 455/226.2; 455/277.2

(58) Field of Classification Search
None
See application file for complete search history.

(56) References Cited

U.S. PATENT DOCUMENTS

| | | | | |
|---|---|---|---|---|
| 5,568,513 A | * | 10/1996 | Croft et al. | 375/224 |
| 6,526,031 B1 | * | 2/2003 | Zaff et al. | 370/335 |
| 2003/0072355 A1 | * | 4/2003 | Lee et al. | 375/147 |
| 2003/0134655 A1 | * | 7/2003 | Chen et al. | 455/522 |
| 2004/0066802 A1 | * | 4/2004 | Ro et al. | 370/528 |
| 2005/0043051 A1 | * | 2/2005 | Takano et al. | 455/522 |
| 2006/0246937 A1 | * | 11/2006 | Lindoff | 455/522 |
| 2006/0262754 A1 | * | 11/2006 | Andersson et al. | 370/332 |
| 2007/0054626 A1 | * | 3/2007 | Li et al. | 455/69 |
| 2007/0287382 A1 | * | 12/2007 | Catreux-Erceg et al. | 455/63.1 |

OTHER PUBLICATIONS

TS 25.101 V2.1.0 Jun. 1999 3$^{rd}$ Generation Partnership Project (3GPP) Technical Specification Group (TSG) RAN WG4 UE Radio Transmission and Reception (FDD). 43 pgs.
TS 25.211 V2.5.0 Oct. 1999 3$^{rd}$ Generation Partnership Project (3GPP); Technical Specification Group (TSG) Radio Access Network (RAN); Working Group 1 (WG1); Physical Channels and Mapping of Transport Channels Onto Physical Channels (FDD). 36 pgs.
3GPP TS 25.214 Mar. 2002 V5.0.0. 3$^{rd}$ Generation Partnership Project; Technical Specification Group Radio Access Network; Physical Layer Procedures (FDD) (Release 5). 56 pgs.
3GPP TS 25.331 Jun. 2002 V4.5.0 3$^{rd}$ Generation Partnership Project; Technical Specification Group Radio Access Network; Radio Resource Control (RRC); Protocol Specification (Release 4). 898 pgs.

* cited by examiner

*Primary Examiner* — Yuwen Pan
*Assistant Examiner* — Fanghwa Wang
(74) *Attorney, Agent, or Firm* — Eschweiler & Associates, LLC

(57) ABSTRACT

A method and a device for controlling uplink/downlink power for radio communication is disclosed. The method includes receiving a radio communications signal in a radio receiver, estimating one or more parameters indicative of the transmission quality of the received radio communications signal based on power control information bits and pilot symbol bits in the radio communications signal, and generating a control signal for the radio receiver and/or the radio transmitter.

31 Claims, 10 Drawing Sheets

METHOD AND DEVICE FOR RADIO COMMUNICATION

FIELD OF THE INVENTION

The application relates to a device and a method for generating a control signal in a radio receiver. More particularly, the invention relates to monitoring the synchronization status of a radio receiver and/or to control uplink/downlink power for radio communication.

BACKGROUND OF THE INVENTION

In radio communications a radio terminal receiving a radio signal often may interpret control signals contained within said radio signal to control various functions of the radio terminal. The radio terminal often uses control signals associated with the radio transmission to determine the synchronization status with a transmitter and/or the transmission quality of the received signals.

BRIEF DESCRIPTION OF THE DRAWINGS

Aspects of the invention are made more evident by way of example in the following detailed description of illustrative embodiments when read in conjunction with the attached drawing figures.

DETAILED DESCRIPTION OF THE INVENTION

Figure 1:
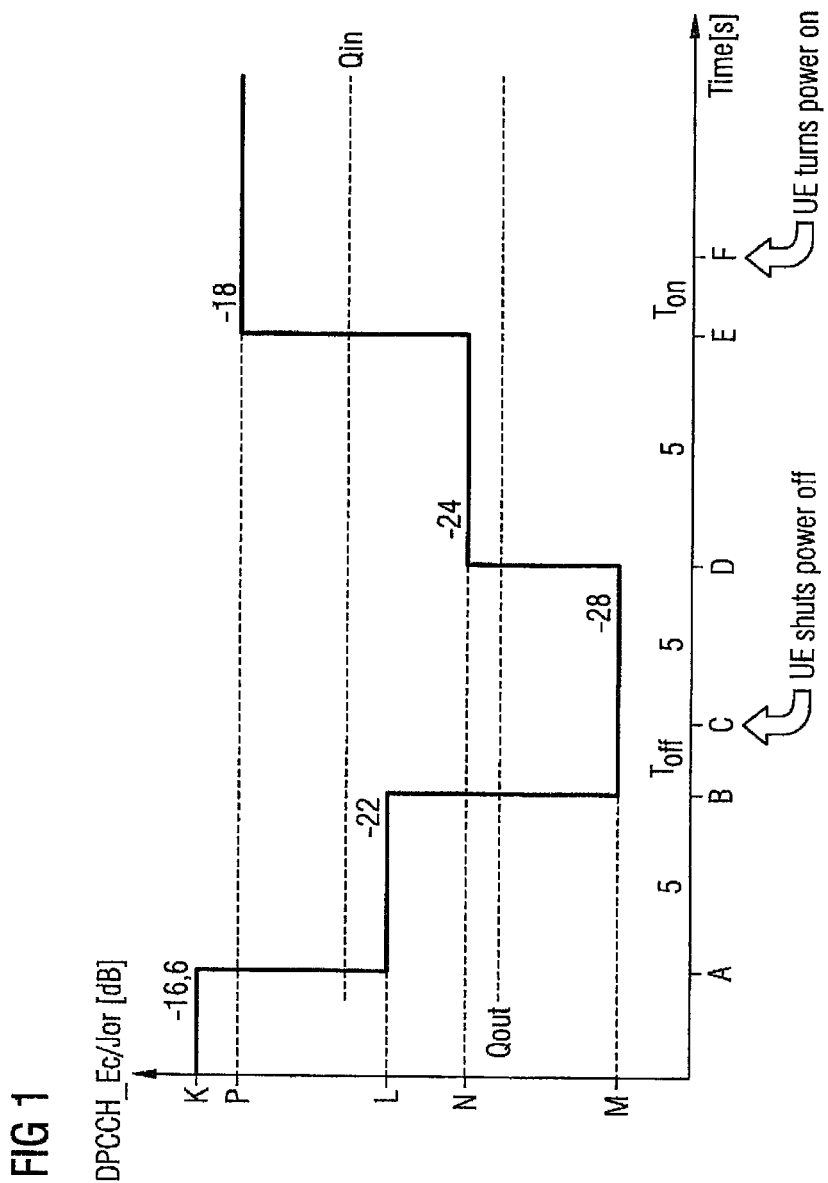
FIG. 1 schematically illustrates a diagram showing a power profile of a radio communications signal versus time.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

In addition, while a particular feature or aspect of an embodiment may be disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may have been used. It should be understood that these terms may have been used to indicate that two elements co-operate or interact with each other regardless whether they are in direct physical or electrical contact, or they are not in direct contact with each other. Furthermore, it should be understood that embodiments of the invention may be implemented in discrete circuits, partially integrated circuits or fully integrated circuits or programming means. Also, the term "exemplary" is merely meant as an example, rather than the best or optimal.

The various aspects summarized may be embodied in various forms. The following description shows by way of illustration of various combinations and configurations in which the aspects may be practiced. It is understood that the described aspects and/or embodiments are merely examples, and that other aspects and/or embodiments may be utilized and structural and functional modifications may be made, without departing from the scope of the present disclosure. The methods and devices described herein may be used for various wireless communication networks such as CDMA (Code Division Multiple Access), TDMA (Time Division Multiple Access), FDMA (Frequency Division Multiple Access), OFDMA (Orthogonal FDMA) and SC-FDMA (Single Carrier FDMA) networks. The terms "network" and "system" are often used interchangeably. A CDMA network may implement a radio technology such as Universal Terrestrial Radio Access (UTRA), cdma2000, etc. UTRA includes Wideband-CDMA (W-CDMA) and other CDMA variants. cdma2000 covers IS-2000, IS-95, and IS-856 standards. A TDMA network may implement a radio technology such as Global System for Mobile Communications (GSM) and derivatives thereof such as e.g. EDGE (Enhanced Data Rate for GSM Evolution), EGPRS (Enhanced General Packet Radio Service), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM.RTM., etc. UTRA and E-UTRA are part of Universal Mobile Telecommunication System (UMTS). UTRA, E-UTRA and GSM are described in documents from an organization named "3rd Generation Partnership Project" (3GPP). By way of example, certain aspects of the techniques are described below for a UMTS network that utilizes W-CDMA, and UMTS terminology is used in much of the description below.

In radio communications systems a transmitter transmitting one or more radio communications signals on one or more radio communications channels may be present. In particular, the transmitter may be a base station or a transmitting device included in a user's device, such as a mobile radio transceiver, a handheld radio device or any similar device. Radio communications signals transmitted by transmitters may be received by receivers such as a receiving device in a mobile radio transceiver, a handheld radio device or any similar device. In particular, radio communications systems as disclosed herein may include UMTS systems, which may conform to the 3GPP standard for UMTS systems. Radio communications signals as disclosed herein may be provided in UMTS systems, in particular over radio communications physical channels, such as primary common pilot channels, secondary common pilot channels, dedicated physical channels, dedicated physical control channels or similar channels according to the UMTS standard.

Radio communications systems may use status signals signaling the status of a radio connection between a radio transmitter and a radio receiver. The status signals may be provided to control units within the transmitter and/or the receiver to serve as decision basis for control processes. In particular, in radio communications systems such as UMTS signals corresponding to the synchronization status of a radio communications connection between a transmitter and a receiver may be provided. The synchronization status signals may be used to report the synchronization status to higher layers of the communications system. Depending on the synchronization status the responding behavior of the receiver upon reception of radio communications signals from the transmitter may be controlled. In particular, the UMTS system may use CPHY-Sync-IND and CPHY-Out-of-Sync-IND primitives, wherein reporting of CPHY-Sync-IND may correspond to reporting a status signal signaling an in-synchronization status to higher layers of the communications system and wherein reporting of CPHY-Out-of-Sync-IND may correspond to reporting a status signal signaling an out-of-synchronization status to higher layers of the communications system.

In one embodiment, the criteria for reporting synchronization status may be defined in two different phases. These criteria may match the criteria given in the 3GPP UMTS standard. Of course, other criteria for reporting the synchronization status may be applied as well.

The first phase may start when higher layers initiate physical dedicated channel establishment and lasts for a first time period of e.g. 160 ms after the downlink dedicated channel is considered established by higher layers. During this time out-of-synchronization shall not be reported and in-synchronization shall be reported using the CPHY-Sync-IND primitive if the following criterion is fulfilled:

The dedicated physical control channel quality over the previous 40 ms period is to be better than a threshold $Q_{in}$. This criterion shall be assumed not to be fulfilled before 40 ms of dedicated physical control channel quality measurements have been collected.

The second phase may start 160 ms after the downlink dedicated channel is considered established by higher layers. During this phase both out-of-synchronization and in-synchronization may be reported as follows. Out-of-synchronization shall be reported using the CPHY-Out-of-Sync-IND primitive if any of the following criteria is fulfilled:

The dedicated physical control channel quality over the previous 160 ms period is estimated as being worse than a threshold $Q_{out}$.

The 20 most recently received transport blocks with a non-zero length CRC (Cyclic Redundancy Check) attached, as observed on all TrCHs (Transport Channels) using non-zero length CRC, have been received with incorrect CRC. In addition, over the previous 160 ms all transport blocks with a non-zero length CRC attached have been received with incorrect CRC. In case no TFCI (Transport Format Combination Indicator) is used this criterion shall not be considered for the TrCHs not using guided detection if they do not use a non-zero length CRC in all transport formats. If no transport blocks with a non-zero length CRC attached are received over the previous 160 ms this criterion shall not be assumed to be fulfilled.

In-synchronization shall be reported using the CPHY-Sync-IND primitive if both of the following criteria are fulfilled:

The dedicated physical control channel quality over the previous 160 ms period is estimated as being better than a threshold $Q_{in}$.

At least one transport block with a non-zero length CRC attached, as observed on all TrCHs using non-zero length CRC, is received with a TTI (Transmission Time Interval) ending in the current frame. If no transport blocks are received, or no transport block having a non-zero length CRC attached in a TTI ending in the current frame is received, and in addition over the previous 160 ms at least one transport block with a non-zero length CRC attached has been received with a correct CRC, this criterion shall be assumed to be fulfilled. If no transport block with a non-zero length CRC attached has been received over the previous 160 ms, this criterion shall also be assumed to be fulfilled. In case no TFCI is used this criterion shall not be considered for the TrCHs not using guided detection if they do not use a non-zero-length CRC in all transport formats.

In one embodiment, $Q_{in}$ and $Q_{out}$ may be considered as upper and lower thresholds, respectively, of a channel transmission quality of a physical channel such as a dedicated physical control channel. One non-limiting example of such thresholds and their implications on the synchronization status during the course of reception of a radio communications signal is given in FIG. 1.

What is shown in FIG. 1 is the signal power profile of a radio communications signal, in particular the dedicated physical control channel (DPCCH) of a UMTS radio communications network. The specific signal power profile shown may be used for testing purposes to test the out-of-sync and in-sync signaling behavior of the user's device. The DPCCH may be specific to one radio link between a UMTS base station and a UMTS mobile radio receiver, also referred to as UE (user equipment). The value shown on the vertical axis is the signal power of the DPCCH normalized to the signal power of the transmitting cells associated with the specific radio link. Prior to a point in time A the normalized DPCCH signal power may be at a level K, for example −16.6 dB. At A the power may drop to a level L, which may in particular be below a first threshold $Q_{in}$, for example −22 dB. Although the signal power is lower than the threshold $Q_{in}$, there is no indication of the connection being out of synchronization to be generated. Thus, between the points A and B which may be separated by a time span of, for example, 5 seconds, the receiver will report to be in-sync with the transmitter. At B the signal power drops yet again to a level M, for example −28 dB, which is lower than a second threshold $Q_{out}$. When the threshold $Q_{out}$ is undershot, it is assumed that the transmission quality is not reliable enough to ensure a proper radio communication over the specific channel. Therefore, after a period of time $T_{off}$ beginning at the point B the receiver will signal the radio communication to be out of synchronization, so that at a point C the UE will temporarily be forced to cease transmission of radio communications signal over the specific radio communications channel. This state is maintained, even if at a point D the signal power may increase to a level N, for example −24 dB, which may exceed the threshold $Q_{out}$ again. Only if the signal power rises above the threshold $Q_{in}$, which may happen at a point E, where it is shown that the signal power rises to a level P, for example −18 dB, the receiver is indicated to be in-sync again. Hence, after a period of time $T_{on}$ following the point E the UE will be allowed to resume transmitting radio communications signals over the specific channel at point F.

From the above, it appears that the choice of the quality thresholds $Q_{in}$ and $Q_{out}$ significantly affect the determination of the synchronization status of the UE. The threshold $Q_{out}$ should correspond to a level of the signal quality where no reliable detection of the signal transmitted on the downlink channel (e.g. DPCCH) can be made. The threshold $Q_{in}$ should correspond to a level of signal quality where detection of the signal transmitted on the downlink channel is significantly more reliable.

ferent channels. For example, the first portion 204 of a slot 202 may contain data information from the dedicated physical data channel (DPDCH). The second portion 205 may contain transmit power control information TPC from the DPCCH. The third portion 206 may contain transmit format combination indicators TFCI from the DPCCH. The fourth portion 207 may contain data information from the DPDCH. The fifth portion 208 may contain pilot symbols from the DPCCH. Other portions may be included as well, for example portions carrying feedback information FBI from the DPCCH. Thus, the downlink DPCH can be seen as a time multiplex of a downlink DPDCH and a downlink DPCCH. The relative length of the respective portions may vary depending on the transmission format used and the transmission order of the portions may be varied as well. Table 2 exemplarily shows parameters for some slot formats used in the UMTS standard:

TABLE 2

| Slot Format | Channel Bit Rate (kbps) | Channel Symbol Rate (kbps) | SF | Bits per Slot | DPDCH Bits per Slot | | DPCCH Bits per Slot | | | Slots per Frame |
| --- | --- | --- | --- | --- | --- | --- | --- | --- | --- | --- |
| | | | | | $N_{Data1}$ | $N_{Data2}$ | $N_{TPC}$ | $N_{TFCI}$ | $N_{Pilot}$ | $N_{Tr}$ |
| 11 | 60 | 30 | 128 | 40 | 6 | 22 | 2 | 2 | 8 | 15 |
| 12 | 120 | 60 | 64 | 80 | 12 | 48 | 4 | 8 | 8 | 15 |
| 13 | 240 | 120 | 32 | 160 | 28 | 112 | 4 | 8 | 8 | 15 |
| 14 | 480 | 240 | 16 | 320 | 56 | 232 | 8 | 8 | 16 | 15 |
| 15 | 960 | 480 | 8 | 640 | 120 | 488 | 8 | 8 | 16 | 15 |
| 16 | 1920 | 960 | 4 | 1280 | 248 | 1000 | 8 | 8 | 16 | 15 |

In one embodiment, for the synchronization reporting test shown in FIG. 1 certain test parameters may be used which are given in Table 1. In this table, $I_{or}$ denotes the signal power of cells associated with the radio link and $I_{oc}$ denotes the signal power of other cells in the radio communications network not associated with the radio link.

TABLE 1

| Parameter | Unit | Value |
| --- | --- | --- |
| $I_{or}/I_{oc}$ | dB | −1 |
| $I_{oc}$ | dBm/3.84 MHz | −60 |
| DPDCH_$E_c/I_{or}$ | dB | Before A: 16.6 dB |
| | | After A: not defined |
| DPCCH_$E_c/I_{or}$ | dB | See FIG. 1 |
| Information Data Rate | kbps | 12.2 |

Figure 2:
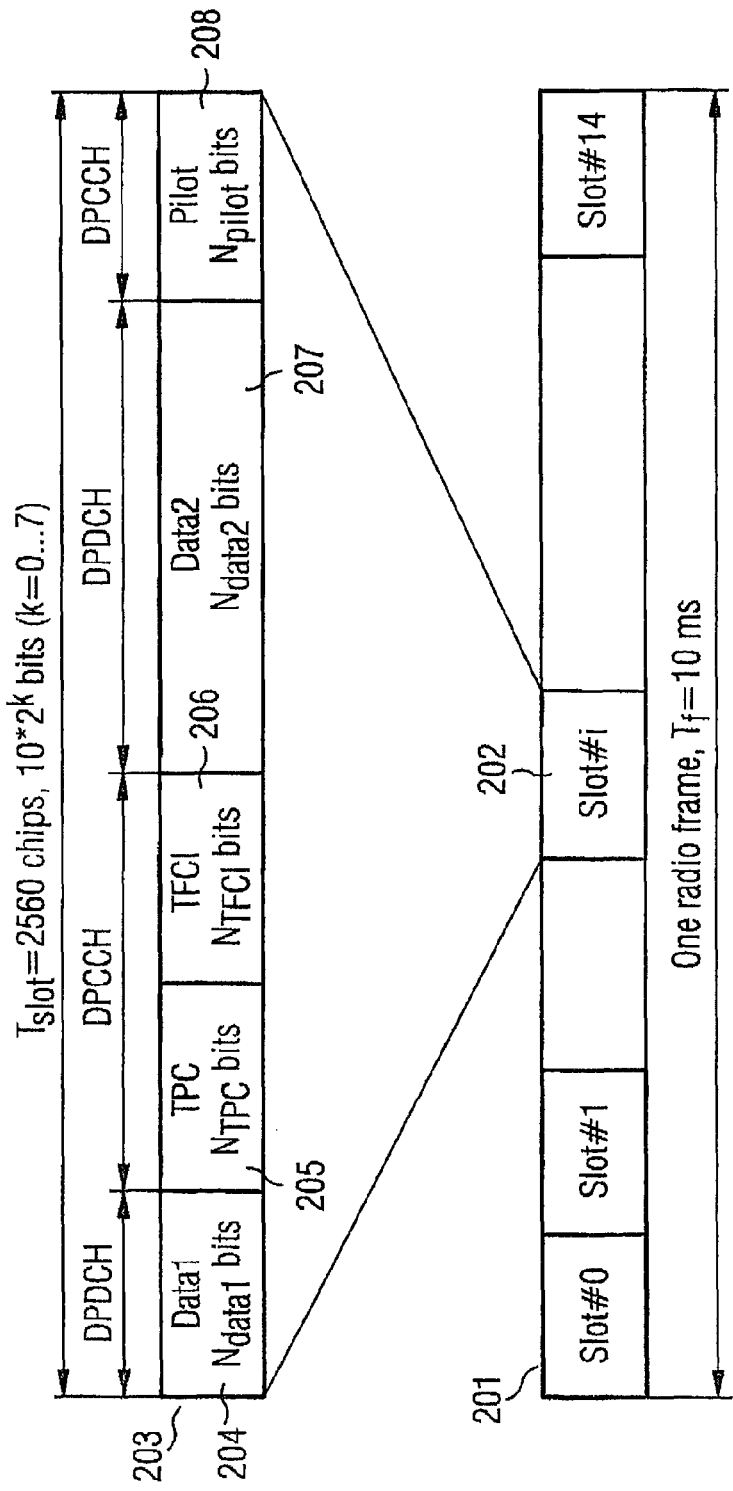
FIG. 2 schematically illustrates an exemplary frame structure for a radio communications signal.

To evaluate the signal power and, hence, the transmission quality of a radio communications signal, information contained in radio communications signals received by the receiver over the radio link may be used. FIG. 2 shows part of a radio communications signal used in a UMTS network according to the technical specifications in the UMTS standard 3GPP TS 25.211. The radio communications signal may have a frame structure as shown in the bottom bar 201. Each radio frame may have a number of slots 202. In particular, for a radio frame length of $T_f$=10 ms the number of slots 202 per frame may be 15. Other slot structures and frame lengths may be used and all such slot structures are contemplated as falling within the scope of the invention.

The upper bar 203 illustrates the data structure of a downlink dedicated physical channel, e.g. the DPCH used in the UMTS standard. Each slot 202 may have a number of chips, in particular 2560 chips in one embodiment, and may consist of different portions used to carry information regarding dif- The TPC (transmit power control) information portion 205 of a slot l in a frame j may include i=1, . . . , $N_{TPC}$ uplink power control (ULPC) information bits $x'_{TPC}(i, j, l)$ used for controlling the uplink power control in the UE. In the following, ULPC-TPC information bits will be referred to simply as TPC information bits. The number of TPC information bits $x'_{TPC}(i,j,l)$ may increase with the number of TPC information portions available in a radio link set (RLS) of a radio communications connection. A radio link set (RLS) may consist of several cells. In a radio link set (RLS) the TPC information bits for any given slot l may all carry the same value, which is either +1 or −1 depending on the desired ULPC.

From the TPC information soft bits $x_{TPC}(i,j,l)$ received at the UE, an error rate may be derived. In a first embodiment, the TPC information soft bits $x_{TPC}(i,j,l)$ may be mapped to hard decisions $z_{TPC}(i,j,l)$ according to Eq. 1:

$$z_{TPC}(i, j, l) = \begin{cases} +1 & \forall\ x_{TPC}(i, j, l) \leq 0 \\ -1 & \forall\ x_{TPC}(i, j, l) > 0 \end{cases} \quad (1)$$

Then, an overall majority decision $d_{TPC}(j,l)$ may be derived from the i estimated hard decisions $z_{TPC}(i,j,l)$ per slot l in the frame j to evaluate the overall TPC information per slot l in the frame j according to Eq. 2:

$$d_{TPC}(j, l) = \begin{cases} +1 & \forall\ \sum_i x_{TPC}(i, j, l) > 0 \\ -1 & \forall\ \sum_i x_{TPC}(i, j, l) \leq 0 \end{cases} \quad (2)$$

The majority decision $d_{TPC}(j,l)$ may be used to determine the intended TPC information. For example, if $d_{TPC}(j,l)$ is estimated as +1, the intended TPC information may be to increase the uplink power in the uplink power control, and if $d_{TPC}(j,l)$ is estimated as −1, the intended TPC information may be to decrease the uplink power in the uplink power control. A TPC error rate q may then be derived by comparing the number of hard decisions $z_{TPC}(i,j,l)$ that do not match the majority decision $d_{TPC}(j,l)$ to the total number of hard decisions $z_{TPC}(i,j,l)$. For example, if the number of TPC information soft bits $x_{TPC}(i,j,l)$ per slot is 4, then a TPC information soft bit sequence {0.4, 0.7, −0.1, 0.7} would yield a sequence of hard decision bits $z_{TPC}(i,j,l)$ of {−1, −1, 1, −1}. The majority decision $d_{TPC}(j,l)$ in this case would be −1. The number of hard decision bits $z_{TPC}(i,j,l)$ that do not match the majority decision $d_{TPC}(j,l)$ is 1, whereas the total number of hard decision bits $z_{TPC}(i,j,l)$ is 4, yielding a TPC error rate q of ¼. This TPC error rate q may then be used as an indicator for the signal quality of the DPCCH and for example be directly compared to the thresholds $Q_{in}$ and $Q_{out}$ to derive the synchronization status of the communications channel. It is to be noted that in this approach, the soft information on the reliability of each TPC bit is not used due to the hard decision of Eq. 1. Furthermore, it is assumed that the majority decision according to Eq. 2 is the correct decision. This may not necessarily be the case especially in unfavorable conditions.

Figure 3:
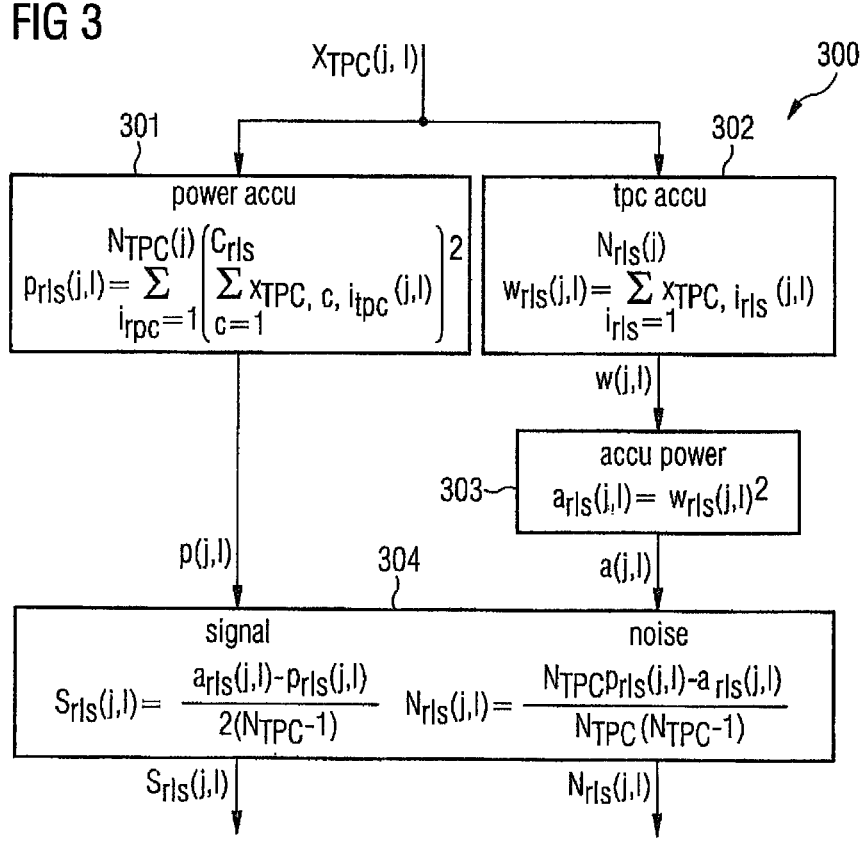
FIG. 3 schematically illustrates a flowchart 300 as one illustrative embodiment.

In another approach, the TPC error rate q may be derived from estimating the signal-to-interference-and-noise ratio (SINR) of the TPC information soft bits. Here, reliability information of each TPC bit is used. FIG. 3 illustrates a flowchart 300 as one embodiment. TPC information soft bits $x_{TPC}(j,l)$ may be used in a step 301 to estimate a quantity $p_{rls}(j,l)$ according to Eq. 3:

$$p_{rls}(j,l) = \sum_{i=1}^{N_{TPC}(j)} \left( \sum_{c=1}^{C_{rls}} x_{TPC,c,i}(j,l) \right)^2, \quad (3)$$

wherein $C_{rls}$ is the number of cells contributing to the radio link set rls and $N_{TPC}$ is the number of TPC information soft bits per slot in the frame j. In another step 302 a quantity $w_{rls}(j,l)$ may be determined according to Eq. 4:

$$w_{rls}(j,l) = \sum_{i=1}^{N_{rls}(j)} x_{TPC,i}(j,l), \quad (4)$$

wherein $N_{rls}(j)$ is the overall number of TPC information soft bits available per slot in all $C_{rls}$ cells of the radio link set combined, i.e. $N_{rls}(j)$ equals to the product of $C_{rls}$ and $N_{TPC}$. From the quantity $w_{rls}(j,l)$ in a further step 303 a quantity $a_{rls}(j,l)$ may be determined according to Eq. 5:

$$a_{rls}(j,l) = w_{rls}^2(j,l) \quad (5).$$

The determined quantities $p_{rls}(j,l)$ and $a_{rls}(j,l)$ may be used in a step 304 to determine the average signal power $S_{rls}(j,l)$ of the TPC information bits and the average noise power $N_{rls}(j,l)$ of the TPC information bits according to Eqs. 6 and 7, respectively:

$$S_{rls}(j,l) = \frac{a_{rls}(j,l) - p_{rls}(j,l)}{2(N_{TPC} - 1)} \quad (6)$$

-continued
$$N_{rls}(j,l) = \frac{N_{TPC}\,p_{rls}(j,l) - a_{rls}(j,l)}{N_{TPC}(N_{TPC} - 1)}. \quad (7)$$

It is to be noted that FIG. 3 could also be understood to show an estimator device configured to compute the quantities $S_{rls}(j,l)$ and $N_{rls}(j,l)$ on the basis of TPC information. The determined quantities $S_{rls}(j,l)$ and $N_{rls}(j,l)$ may be used to define a ratio which is indicative of the SINR of the TPC information soft bits $x_{TPC}(j,l)$. This quantity is an estimation of the transmission quality of the radio communications signal containing the TPC information soft bits $x_{TPC}(j,l)$. It may be compared with the thresholds $Q_{out}$ and $Q_{in}$ to decide the synchronization status of the UE with high sensitivity.

Figure 4:
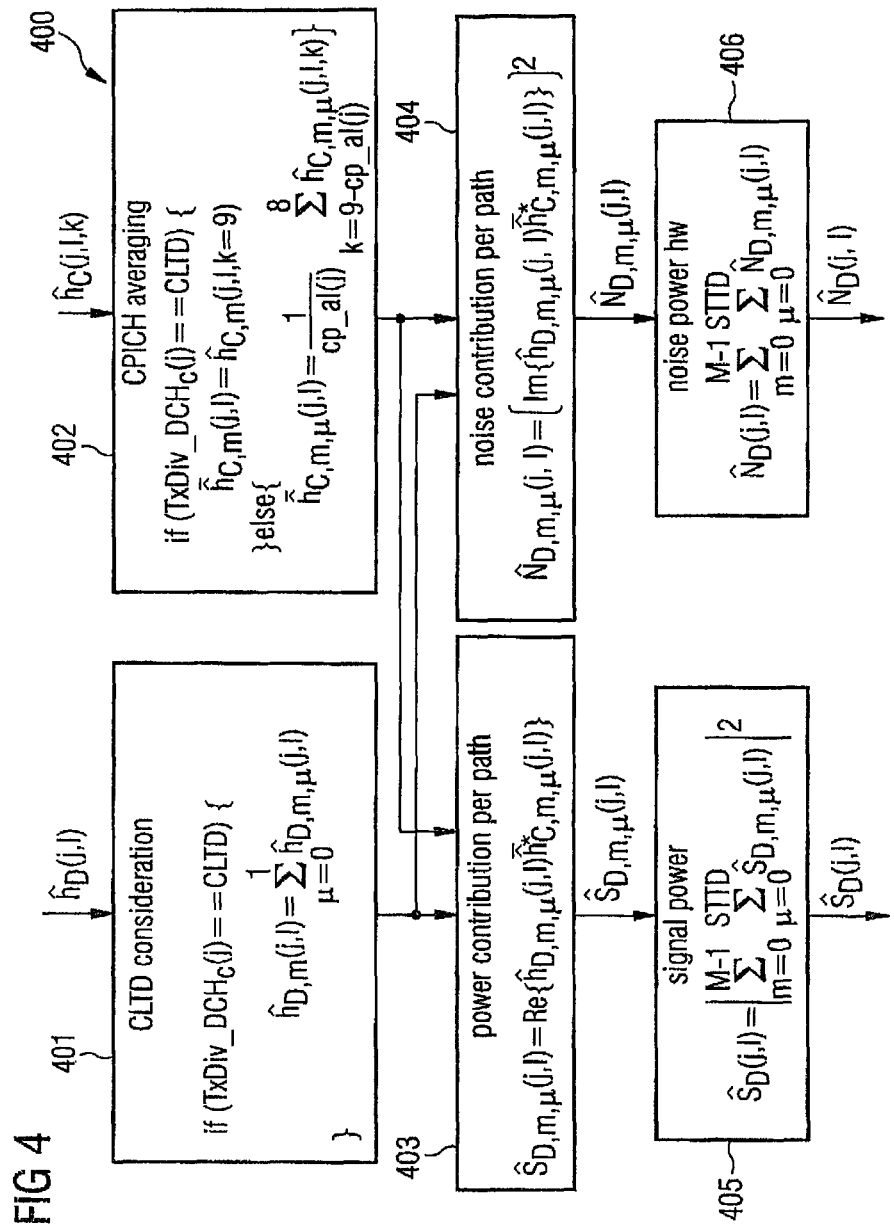
FIG. 4 schematically illustrates another flowchart 400 as one illustrative embodiment.

Radio communications signals may further include portions containing pilot symbols. Pilot symbols comprise data which is usually known to the receiver. It may therefore be possible to generate a quantity indicative of the transmission quality of a radio communications signal containing pilot symbols from signal power estimates and noise power estimates of the respective pilot symbols. FIG. 4 illustrates a flowchart 400 showing steps which may be undertaken to generate a signal power estimate $S_D(j,l)$ and a noise power estimate $N_D(j,l)$ of pilot symbols contained in radio communications signals according to one embodiment. A radio communications signal may contain pilot symbol bits. In particular, DPCCH may contain information portions such as information portion 208 in FIG. 2 which include pilot symbol bits. Other radio communication channels in a UMTS radio communications network may provide information portions containing pilot symbol bits as well, for example the primary common pilot channel (P-CPICH) or the secondary common pilot channel (S-CPICH) which form part of the common pilot channel (CPICH). From the pilot symbol bits, channel weight estimates (CWE) may be determined, in particular CWE $h_D(j,l)$ for the pilot symbol bits of the DPCCH and CWE $h_C(j,l)$ for the pilot symbol bits of the CPICH, wherein j is the frame index and l is the slot index in the frame j. In step 401 of FIG. 4, it may be considered whether the radio communications signal is transmitted on multiple antennae, in particular two antennae. If the radio communications signal is transmitted using closed-loop transmission diversity (CLTD), where the number μ of transmitting antennae equals 2, the CWE $h_{D,m}(j,l)$ per rake finger m may be determined by adding up the CWE $h_{D,m,\mu}(i,l)$ per rake finger m and transmission antenna μ according to Eq. 8:

$$h_{D,m}(j,l) = \sum_{\mu=0}^{1} h_{D,m,\mu}(j,l). \quad (8)$$

The CWE $h_C(j,l)$ of the pilot symbol bits of the CPICH may be averaged in step 402. The CWE $h_D(j,l)$ may in some embodiments already be averaged, so that the averaging step for the CWE $h_D(j,l)$ may be omitted. For the averaging of the CWE $h_C(j,l)$ it may be determined whether CLTD is used or not. If CLTD is used, the averaged CWE $\bar{h}_{C,m}(j,l)$ per rake finger m may be determined according to Eq. 9:

$$\bar{h}_{C,m}(j,l) = h_{C,m}(j,l,k=9) \quad (9),$$

wherein the averaged CWE $\bar{h}_{C,m}(j,l)$ equals to the CWE $h_C(j,l)$ of the ninth pilot symbol in the CPICH. If CLTD is not used, the averaged CWE $\bar{h}_{C,m,\mu}(j,l)$ per rake finger m may be determined according to Eq. 10:

$$\bar{h}_{C,m,\mu}(j,l) = \frac{1}{\text{cp\_al}(j)} \sum_{k=9-\text{cp\_al}(j)}^{8} h_{C,m}(j,l,k), \quad (10)$$

wherein cp_al(j) is the number of symbols in the upper right block of the pilot symbols and k is the pilot symbol index.

The determined CWE $h_{D,m}(j,l)$ and $\bar{h}_{C,m,\mu}(j,l)$ for the DPCCH and the CPICH, respectively, may be used to determine the signal power contribution $S_{D,m,\mu}(j,l)$ per transmission path in step 403 and the noise power contribution $N_{D,m,\mu}(j,l)$ per transmission path in step 404. The signal power contribution $S_{D,m,\mu}(j,l)$ may be determined according to Eq. 11:

$$S_{D,m,\mu}(j,l) = \text{Re}\{h_{D,m,\mu}(j,l)\bar{h}^*_{C,m,\mu}(j,l)\} \quad (11),$$

and the noise power contribution $N_{D,m,\mu}(j,l)$ may be determined according to Eq. 12:

$$N_{D,m,\mu}(j,l) = (\text{Im}\{h_{D,m,\mu}(j,l)\bar{h}^*_{C,m,\mu}(j,l)\})^2 \quad (12).$$

The overall signal power estimate $S_D(j,l)$ and the overall noise power estimate $N_D(j,l)$ for the pilot symbol bits in the DPCCH may be determined by combining the signal power contribution $S_{D,m,\mu}(j,l)$ and the noise power contribution $N_{D,m,\mu}(j,l)$ for all M transmission paths at 405 and 406, respectively, and all STTD space-time transmit diversity antennae according to Eqs. 13 and 14, respectively:

$$S_D(j,l) = \left| \sum_{m=0}^{M-1} \sum_{\mu=0}^{STTD} S_{D,m,\mu}(j,l) \right|^2, \quad (13)$$

$$N_D(j,l) = \sum_{m=0}^{M-1} \sum_{\mu=0}^{STTD} N_{D,m,\mu}(j,l). \quad (14)$$

It is to be noted that FIG. 4 could also be understood to show an estimator device configured to compute the quantities $S_D(j,l)$ and the overall noise power estimate $N_D(j,l)$ on the basis of the pilot symbol bits. Further, it is to be noted that this estimator device could also be applied to TPC information, i.e. could be used similar to the estimator device shown in FIG. 3. However, the overall signal power estimate $S_D(j,l)$ and the overall noise power estimate $N_D(j,l)$ according to FIG. 4 do not take into account the coding gain by the repetition code for the TPC bits. Therefore, in this case, a respective scaling with respect to the coding gain may be required, and such an alternative is contemplated as falling within the scope of the invention.

Figure 5:
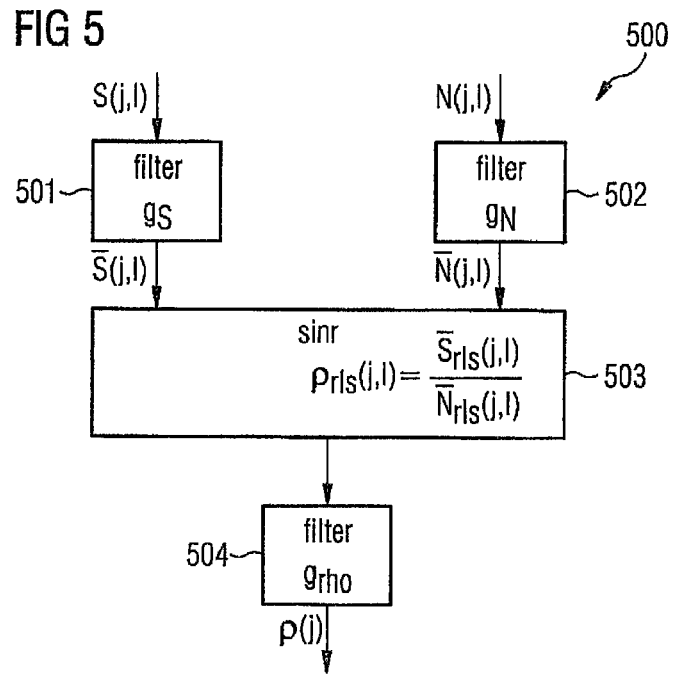
FIG. 5 schematically illustrates a device 500 as one illustrative embodiment.

The signal power and noise power estimated $S_{rls}(j,l)$, $N_{rls}(j,l)$ or $S_D(j,l)$, $N_D(j,l)$ determined by the processes or estimator devices shown in FIGS. 3 and 4 may be subjected to filtering and SINR calculation with a device 500 as exemplarily shown in FIG. 5. The signal power estimates $S_{rls}(j,l)$, $S_D(j,l)$ may be filtered by a filter 501. In one embodiment, the filter 501 may be a 1-tap IIR filter having a filter characteristic $g_s$. The filter 501 may be configured to filter the signal power estimates $S_{rls}(j,l)$, $S_D(j,l)$ outputting filtered signal power estimates $\bar{S}_{rls}(j,l)$, $\bar{S}_D(j,l)$, respectively. The noise power estimates $N_{rls}(j,l)$, $N_D(j,l)$ may be filtered by a filter 502. In one embodiment, the filter 502 may be a 1-tap IIR filter having a filter characteristic $g_N$. The filter 502 may be configured to filter the noise power estimates $N_{rls}(j,l)$, $N_D(j,l)$ outputting filtered noise power estimates $\bar{N}_{rls}(j,l)$, $\bar{N}_D(j,l)$, respectively.

From the respective filtered signal power estimates $\bar{S}_{rls}(j,l)$, $\bar{S}_D(j,l)$ and filtered noise power estimates $\bar{N}_{rls}(j,l)$, $\bar{N}_D(j,l)$ signal-to-interference-and-noise ratios (SINR)

$$\rho_{rls}(j,l) = \frac{\bar{S}_{rls}(j,l)}{\bar{N}_{rls}(j,l)} \text{ and } \rho_D(j,l) = \frac{\bar{S}_D(j,l)}{\bar{N}_D(j,l)},$$

respectively, may be determined in an SINR determination unit 503. The determined SINR may be input to a filter 504 to output a filtered SINR. In one embodiment, the filter 504 may be a 1-tap IIR filter having a filter characteristic $g_{rho}$. Thus, the estimator device shown in FIG. 3 feeding the device shown in FIG. 5 is an SINR estimator based on TPC information. The estimator device shown in FIG. 4 feeding the device shown in FIG. 5 is an SINR estimator based on pilot bit information (and could also be used as another SINR estimator for TPC information if appropriately adapted as outlined above).

Different SINR estimates may be combined if the scaling relationships between the estimates are known and applied accordingly. For example, the SINR estimates for the TPC information bits $\rho_{rls}(j,l)$ and the SINR estimate for the pilot bits $\rho_D(j,l)$ may be combined according to Eq. 15:

$$\rho_{comb} = \frac{N_{TPC}\rho_{rls}(j,l) + N_{pilot}\rho_D(j,l)}{N_{TPC} + N_{pilot}}. \quad (15)$$

Eq. 15 takes into account that the number of TPC information bits and the number of pilot symbol bits in a slot l of a frame j in the DPCCH may differ. Therefore, in one embodiment, the combined SINR $\rho_{comb}$ may be a weighted average of the SINR estimates $\rho_{rls}(j,l)$ and $\rho_D(j,l)$. Furthermore, in one embodiment, the TPC information portion of the DPCCH and the pilot symbol portion of the DPCCH may be transmitted using different power offsets $P_{pilot-DPDCH}$ and $P_{TPC-DPDCH}$ with respect to the transmission power of the DPDCH. The SINR estimates $\rho_{rls}(j,l)$ and $\rho_D(j,l)$ may be scaled accordingly with respect to these constant power offsets $P_{pilot-DPDCH}$ and $P_{TPC-DPDCH}$.

Alternatively, in one embodiment, it may be possible to first combine the signal power estimates $\bar{S}_{rls}(j,l)$, $\bar{S}_D(j,l)$ and the noise power estimates $\bar{N}_{rls}(j,l)$, $\bar{N}_D(j,l)$ prior to determining SINR estimates. Again, when combining the signal power estimates $\bar{S}_{rls}(j,l)$, $\bar{S}_D(j,l)$ and the noise power estimates $\bar{N}_{rls}(j,l)$, $\bar{N}_D(j,l)$ scaling according to the power offsets $P_{pilot-DPDCH}$ and $P_{TPC-DPDCH}$ may be performed in one embodiment. The combined signal power estimates and noise power estimates may be used to determine an overall SINR estimate in one embodiment.

Figure 6:
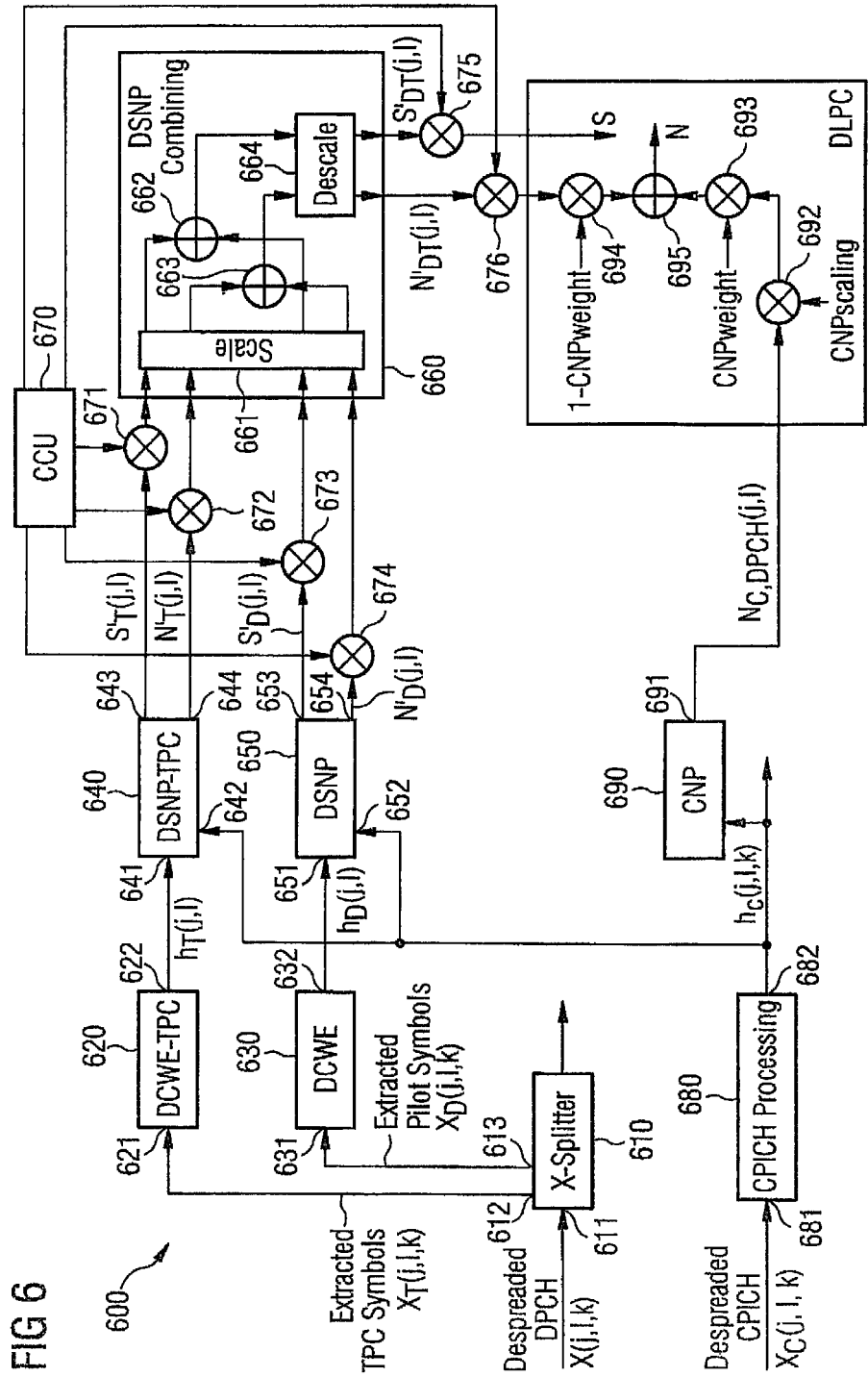
FIG. 6 schematically illustrates another device 600 as one illustrative embodiment.

FIG. 6 schematically illustrates a device 600 as an illustrative embodiment. The device 600 may include a splitter unit 610 configured to extract symbol portions from a radio communications signal. In particular the splitter unit 610 may include an input 611 configured to receive a radio communications signal, in one embodiment a despreaded DPCH signal. The splitter unit 610 may further include a first output 612 configured to output extracted TPC symbol portions from the radio communications signal and a second output 613 configured to output extracted pilot symbol portions from the radio communications signal. The extracted TPC symbol portions may be fed to an input 621 of a first weighting unit DCWE-TPC (DPCH Channel Weight Estimation for TPC symbols) 620 configured to output channel weight estimates of the TPC symbols at an output 622. The extracted pilot symbol portions from the output 613 of the splitter 610 may be fed to an input 631 of a second weighting unit DCWE 630 configured to output channel weight estimates of the pilot symbols at an output 632.

The device 600 may further include a first signal and noise power evaluation unit DSNP-TPC (DPCH Signal and Noise Power Estimation TPC) 640 configured to receive the channel weight estimates of the TPC symbol portions at a first input 641. The first signal and noise power evaluation unit 640 may be configured to determine a first parameter indicative of the signal power of the TPC symbols which may be output at a first output 643. The first signal and noise power evaluation unit 640 may be configured to determine a second parameter indicative of the noise power of the TPC symbols which may be output at a second output 644. It is to be noted that in one embodiment the first signal and noise power evaluation unit 640 may be implemented according to the estimator device shown in FIG. 3. The device 600 may further include a second signal and noise power evaluation unit DSNP 650 configured to receive the channel weight estimates of the pilot symbol portions at a first input 651. The second signal and noise power evaluation unit 650 may be configured to determine a third parameter indicative of the signal power of the pilot symbols which may be output at a first output 653. The second signal and noise power evaluation unit 650 may be configured to determine a fourth parameter indicative of the noise power of the pilot symbols which may be output at a second output 654. It is to be noted that in one embodiment the second signal and noise power evaluation unit 650 may be implemented according to the estimator device shown in FIG. 4.

The device 600 may include a compensation control unit CCU 670. The compensation control unit CCU 670 may be configured to generate compensation factors which may be supplied to multiplying units 671, 672, 673, 674, 675 and 676. An input of the multiplying unit 671 may be coupled to output 643 of the first signal and noise power evaluation unit 640. An input of the multiplying unit 672 may be coupled to output 644 of the first signal and noise power evaluation unit 640. An input of the multiplying unit 673 may be coupled to output 653 of the second signal and noise power evaluation unit 650. An input of the multiplying unit 674 may be coupled to output 654 of the second signal and noise power evaluation unit 650. The compensation factors supplied to multiplying units 671, 672, 673, 674, 675 and 676 may in one embodiment take into account a power offset between the transmission power of the pilot symbol portion and the TPC information portion of the radio communications signal, in particular the DPCCH signal, on the one hand and the transmission power of the data information portions of the radio communications signal, in particular the DPDCH signal, on the other hand. The compensation factor may vary for different frames j and may be input to the multiplying units 671, 672, 673 and 674 for multiplying the compensation factor with the respective combined signal power estimate or noise power estimate. After scaling and combining, the respective combined signal power estimate or noise power estimate may be multiplied with further compensation factors generated by the compensation control unit 670. The compensation control unit 670 may be part of a downlink power control section of a radio receiver receiving the radio communications signal in one embodiment. The device 600 may include a combining unit "DSNP combining" 660. The combining unit 660 may include a scaling unit 661, a first adding unit 662, a second adding unit 663 and a descaling unit 664. The combining unit 660 may be configured to receive the first parameter, the second parameter, the third parameter and the fourth parameter and feed those to the scaling unit 661.

The scaling unit 661 may be configured to scale the first parameter, the second parameter, the third parameter and the fourth parameter according to different scaling schemes. In one embodiment, the first parameter may be the signal power estimate $S_T(j,l)$ of TPC control information bits of a slot l in a frame j of the radio communications signal, in the DPCCH signal. The second parameter may be the noise power estimate $N_T(j,l)$ of TPC control information bits of the DPCCH signal, the third parameter may be the signal power estimate $S_D(j,l)$ of pilot symbol bits of the DPCCH signal and the fourth parameter may be the noise power estimate $N_D(j,l)$ of pilot symbol bits of the DPCCH signal. In one embodiment, one scaling scheme may scale the input parameters of the scaling unit 660 to obtain scaled input parameters each denoted with a superscript "sc" according to Eq. 16:

$$S_T^{sc}(j,l)=S_T(j,l) \quad N_T^{sc}(j,l)=N_T(j,l)$$

$$S_D^{sc}(j,l)=S_D(j,l) \quad N_D^{sc}(j,l)=N_D(j,l). \tag{16}$$

One scaling scheme may alternatively be used to scale the input parameters according to Eq. 17:

$$S_T^{sc}(j,l)=10\log_{10} S_T(j,l) \quad N_T^{sc}(j,l)=10\log_{10} N_T(j,l)$$

$$S_D^{sc}(j,l)=10\log_{10} S_D(j,l) \quad N_D^{sc}(j,l)=10\log_{10} N_D(j,l). \tag{17}$$

One further scaling scheme may alternatively be used to scale the input parameters according to Eq. 18:

$$S_T^{sc}(j,l)=\sqrt{S_T(j,l)} \quad N_T^{sc}(j,l)=\sqrt{N_T(j,l)}$$

$$S_D^{sc}(j,l)=\sqrt{S_D(j,l)} \quad N_D^{sc}(j,l)=\sqrt{N_D(j,l)}. \tag{18}$$

Each of the scaling schemes given in Eq. 16 to 18 may be implemented in the scaling unit 660.

The scaled first, second, third and fourth parameters $S_T^{sc}(j,l)$, $N_T^{sc}(j,l)$, $S_D^{sc}(j,l)$, $N_D^{sc}(j,l)$ may then be weighted according to the number of TPC information bits $N_{TPC}$ and DPCCH pilot symbol bits $N_{pilot}$. The first and third parameter $S_T^{sc}(j,l)$ and $S_D^{sc}(j,l)$ may be input to the first adding unit 662 and added in a weighted fashion according to Eq. 19:

$$S_{DT}^{sc}(j,l) = \frac{N_{pilot}S_D^{sc}(j,l) + N_{TPC}S_T^{sc}(j,l)}{N_{pilot}+N_{TPC}}, \tag{19}$$

wherein $S_{DT}^{sc}(j,l)$ is the weighted combined signal power estimate of the TPC information bits and the pilot symbol bits in the DPCCH signal. The second and fourth parameter $N_T^{sc}(j,l)$ and $N_D^{sc}(j,l)$ may be input to the second adding unit 663 and added in a weighted fashion according to Eq. 20:

$$N_{DT}^{sc}(j,l) = \frac{N_{pilot}N_D^{sc}(j,l) + N_{TPC}N_T^{sc}(j,l)}{N_{pilot}+N_{TPC}}, \tag{20}$$

wherein $N_{DT}^{sc}(j,l)$ is the weighted combined noise power estimate of the TPC information bits and the pilot symbol bits in the DPCCH signal. The combined signal power estimate $S_{DT}^{sc}(j,l)$ and the combined noise power estimate $N_{DT}^{sc}(j,l)$ may then be subject to a descaling process in the descaling unit 664 in one embodiment. One descaling scheme given in Eq. 21 may be used when the input parameters have been scaled according to the scaling scheme given in Eq. 16:

$$S_{DT}(j,l)=S_{DT}^{sc}(j,l)$$

$$N_{DT}(j,l)=N_{DT}^{sc}(j,l). \tag{21}$$

One descaling scheme given in Eq. 22 may be used when the input parameters have been scaled according to the scaling scheme given in Eq. 17:

$$S_{DT}(j,l) = 10 \wedge (S_{DT}^{sc}(j,l)/10)$$

$$N_{DT}(j,l) = 10 \wedge (N_{DT}^{sc}(j,l)/10). \tag{22}$$

One descaling scheme given in Eq. 23 may be used when the input parameters have been scaled according to the scaling scheme given in Eq. 18:

$$S_{DT}(j,l) = (S_{DT}^{sc}(j,l))^2$$

$$N_{DT}(j,l) = (N_{DT}^{sc}(j,l))^2. \tag{23}$$

Of course, other scaling and descaling schemes may be used as well and such alternative embodiments are contemplated as falling within the scope of the invention.

It may also be possible in one embodiment to combine the signal power estimate $S_T^{sc}(j,l)$ and the noise power estimate $N_T^{sc}(j,l)$ of the TPC information bits in the DPCCH signal to obtain a signal-to-interference-and-noise ratio for the TPC information symbols and to combine the signal power estimate $S_D^{sc}(j,l)$ and the noise power estimate $N_D^{sc}(j,l)$ of the pilot symbol bits in the DPCCH signal to obtain a signal-to-interference-and-noise ratio for the pilot symbols prior to scaling.

A first output of the descaling unit 664 may be coupled to multiplying unit 675 to multiply the combined signal power estimate $S_{DT}'(j,l)$ with a compensation factor generated by the compensation control unit 670. A second output of the descaling unit 664 may be coupled to multiplying unit 676 to multiply the combined noise power estimate $N_{DT}'(j,l)$ with a compensation factor generated by the compensation control unit 670. The compensation factors may in one embodiment take into account a power offset between the transmission power of the pilot symbol portion and the TPC information portion of the radio communications signal, in particular the DPCCH signal, on the one hand and the transmission power of the data information portions of the radio communications signal, in particular the DPDCH signal, on the other hand.

The device 600 may further include a further processing unit "CPICH processing" 680 having an input configured to receive a further radio communications signal, in one embodiment a common pilot channel (CPICH) signal containing a plurality of further pilot symbols. The further processing unit 680 may be configured to generate further channel weight estimates of the further pilot symbols at an output 682 which may be supplied to an input 642 of the first signal and noise power evaluation unit 640 and to an input 652 of the second signal and noise power evaluation unit 650. The further channel weight estimates may be used during the channel weight estimation process in the first signal and noise power evaluation unit 640 and the second signal and noise power evaluation unit 650. The further channel weight estimates may be supplied to a further noise power evaluation unit CNP (CPICH Noise Power Estimation) 690 which is configured to generate a fifth parameter indicative of the noise power of the common pilot symbols in the further radio communications signal. The further noise power evaluation unit 690 may be configured to output a further noise power estimate at an output 691 which may be supplied to a multiplying unit 692. The multiplying unit 692 may be configured to multiply the further noise power estimate with a scaling factor CNPscaling. The scaled further noise power estimate may then be supplied to a multiplying unit 693 which may be configured to multiply the scaled further noise power estimate with a weighting factor CNPweight. The weighting factor CNPweight may be based in one embodiment on a relative weight of the number of pilot symbols in the DPCCH signal and the number of pilot symbols in the CPICH signal. The combined noise power estimate $N_{DT}(j,l)$ which may be outputted by the multiplying unit 676 may be multiplied in a multiplying unit 694 with a weighting factor 1-CNPweight which is the difference between 1 and the weighting factor CNPweight. The weighted combined noise power estimate $N_{DT}(j,l)$ output by the multiplying unit 694 and the weighted scaled further noise power estimate output by the multiplying unit 693 may then be added in an adding unit 695 to generate an overall combined noise power estimate N. The overall combined noise power estimate N and the overall signal power estimate S outputted by the multiplying unit 675 may further be used to generate an overall signal-to-interference-and-noise power estimate S/N.

In the following embodiment, the algorithms that may be used in the first weighting unit 620 and the second weighting unit 630 are described. In the first weighting unit 620 the TPC information bits $x_{T,m}(j,l,k)$ of the symbol m in the slot l of the frame j in the rake finger m of the DPCCH signal may be used to determine channel weight estimates $h_{T,m}(j,l)$ for the TPC information portion in the slot l of the frame j. Although the TPC information bits are not known at the receiver, it is possible to determine channel weight estimates $h_{T,m}(j,l)$ which could then be used for signal power and noise power estimation. In a certain slot l, all TPC information bits may be identical, i.e. the TPC command of this slot is repeated on every TPC information bit. Thus, a constant reference TPC information bit pattern (all +1 or all −1) may be used according to Eq. 24:

$$h_{T,m}(j,l) = \frac{1}{K_{TPC}} \sum_{k=0}^{K_{TPC}-1} x_{T,m}(j,l,k) p_{TPC}^*(k), \tag{24}$$

wherein $K_{TPC}$ is the number of TPC information bits per slot l and $p_{TPC}^*(k)$ is the complex conjugate of a series of reference TPC information bits. As already mentioned, the series $p_{TPC}(k)$ of reference TPC information bits may be set to a series of +1 bits or to a series of −1 bits. The resulting channel estimate will either be correct, if the correct TPC command was met, or will have a phase offset of 180°, if the wrong TPC command was applied. The phase offset may be random on a slot basis. However, due to the squares taken in the first weighting unit 620 (Eq. 11 and 12), this ambiguity has no impact and the signal and noise power estimates at the output of the first weighting unit 620 are valid.

In the second weighting unit 630 the pilot symbol bits $x_{D,m}(j,l,k)$ of the symbol m in the slot l of the frame j in the rake finger m of the DPCCH signal may be used to determine channel weight estimates $h_{D,m}(j,l)$ for the pilot symbol portion in the slot l of the frame j according to Eq. 25:

$$h_{D,m}(j,l) = \frac{1}{K_D} \sum_{k=0}^{K_D-1} x_{D,m}(j,l,k) p_D^*(k), \tag{25}$$

wherein $K_D$ is the number of pilot symbol bits per slot l and $p_D^*(k)$ is the complex conjugate of the known DPCCH pilot sequence $p_D(k)$.

For the signal and noise power evaluation units 640 and 650 similar algorithms as those described in conjunction with FIGS. 3 and 4 may be applied. Of course, other methods for determining signal and noise power estimates may be used as well in alternative embodiments.

Figure 7:
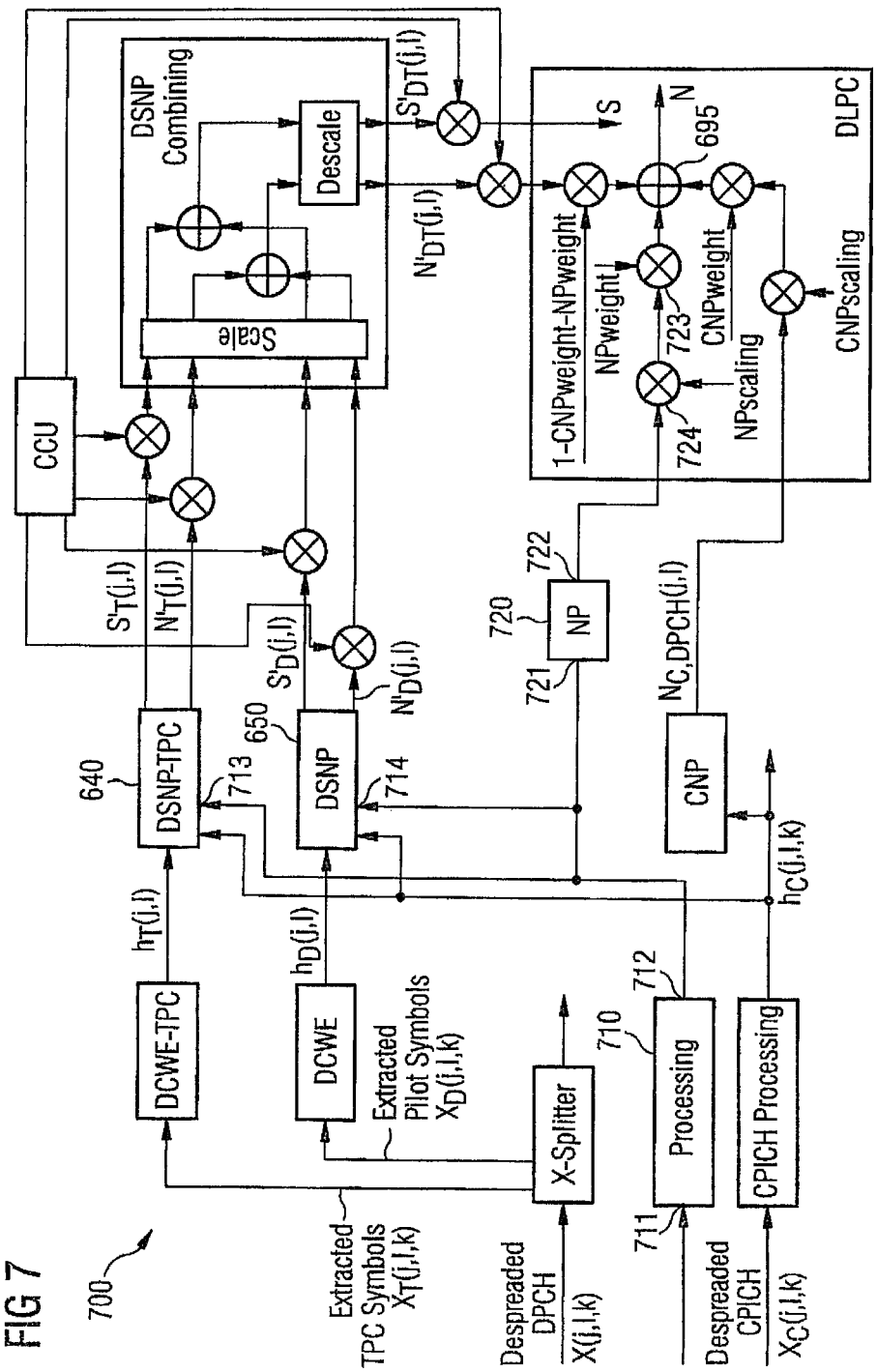
FIG. 7 schematically illustrates another device 700 as one illustrative embodiment.

FIG. 7 schematically illustrates a device 700 as an illustrative embodiment. The device 700 differs from the device 600 in that a further processing unit 710 having an input 711 and an output 712 is included in the device 700. The further processing unit 710 may be configured to generate channel weight estimates of further pilot symbols included in further radio communication signals other than, for example, the DPCCH or the CPICH signal. The further channel weight estimates may be output at output 712 and supplied to an input 713 of the first signal and noise power evaluation unit 640 and to an input 714 of the second signal and noise power evaluation unit 650. The generation of the signal and noise power estimates of the first and second signal and noise power evaluation units 640 and 650 may additionally be based on the further channel weight estimates generated by the further processing unit 710 in this embodiment. The further channel weight estimates at output 712 may also be an input to one or more additional signal and noise power estimation units. The further channel weight estimates may be input to an input 721 of a further noise power evaluation unit NP 720 which may be configured to output a further noise power estimate at an output 722. The further noise power estimate may be scaled at a multiplying unit 724 by multiplying the further noise power estimate with a scaling factor NPscaling. The scaled further noise power estimate may then be input to a multiplying unit 723 to generate a weighted scaled further noise power estimate by multiplying the scaled further noise power estimate with a weighting factor NPweight. The weighted scaled further noise power estimate may be input to the adding unit 695 which may be configured to add the weighted scaled further noise power estimate output by the multiplying unit 723 to the weighted combined noise power estimate $N_{DT}(j,l)$ output by the multiplying unit 694 and the weighted scaled further noise power estimate output by the multiplying unit 693 to generate an overall noise power estimate N. The weighting factor 1-CNPweight input to the multiplying unit 694 explained in FIG. 6 may be corrected for the additional weighting factor NPweight such that the weighting factor input to the multiplying unit 694 in device 700 may in particular be equal to 1-CNPweight-NPweight. It may be provided for the various weighting factors NPweight, CNPweight and 1-CNPweight-NPweight to be controlled by a weight control unit which is not shown in FIG. 7.

Further, in radio communications systems, downlink power control (DLPC) is used to control the power of a dedicated physical channel (in UMTS the DPCH) transmitted by the base station to an UE. For the DLPC, downlink transmit power control (DLPC-TPC) bits are transmitted in the uplink, i.e. from the UE to the base station. The DLPC-TPC bits can signal power up or power down and are evaluated by the base station. The base station reacts according to its mechanism, i.e. raises or lowers the transmission power based on the evaluation result.

For instance, the base station may define a target transmission quality for the UE in form of a target bit error rate (BER) or a target block error rate (BLER). In the UE, the transmission quality of the received signal associated with the dedicated downlink physical channel (in UMTS the DPCH) may be determined, e.g. as an SINR. This measured transmission quality value, e.g. SINR, may be compared to a threshold transmission quality value, e.g. threshold SINR, which may be calculated based on the target BER or BLER communicated by the base station. If the measured transmission quality value is smaller (higher) than the threshold transmission quality value, the UE generates and transmits DLPC-TPC bits which may signal power up (power down) to the base station.

The task of estimating the signal power and the noise power of the dedicated downlink physical channel (in UMTS the DPCH) in the UE is complicated by the fact that, in contrast to the common pilot channel (CPICH), only the dedicated pilot symbols, i.e. a small fraction of the symbols in a slot (cf. FIG. 2 and Table 2), are known at the UE.

Thus, a downlink power control (DLPC) based on combined pilot and TPC signal power and noise power estimation may be used. The consideration of the TPC bits for downlink power control (DLPC) purposes reduces the variance of the signal power and noise power estimates. Again, embodiments use the fact that in one slot all TPC bits are identical, and possible phase error is removed by a square function.

Figure 8:
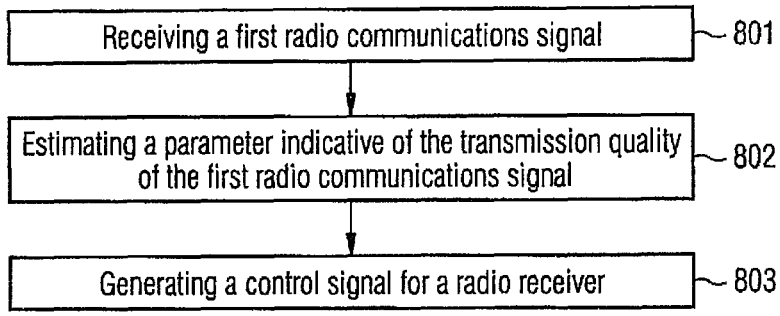
FIG. 8 schematically illustrates another method 800 as one illustrative embodiment.

FIG. 8 illustrates a method as one exemplary embodiment. In a first step 801 a first radio communications signal is received in a radio receiver, the first radio communications signal having a power control information portion and a first pilot symbol information portion. The first radio communications signal may in particular be a signal transmitted on a DPCCH channel in a UMTS network. The radio receiver may be a mobile radio receiver. In a second step 802 a parameter indicative of the transmission quality of the first radio communications signal is estimated on the basis of power control information bits in the power control information portion and on the basis of pilot symbol bits in the first pilot symbol information portion. In a third step 803 a control signal for the radio receiver is generated according to the parameter estimated in step 802. In particular, the control signal may be a signal indicating the synchronization status of the radio receiver.

Figure 9:
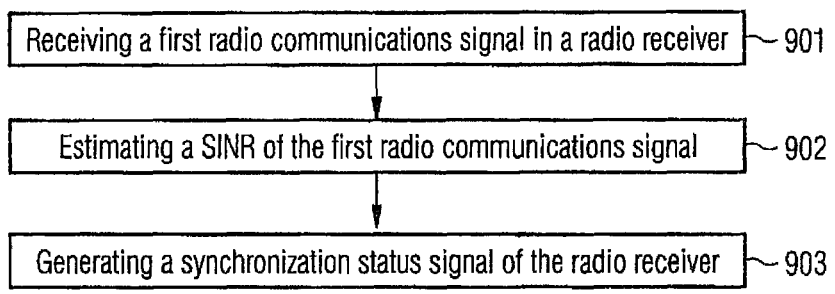
FIG. 9 schematically illustrates another method 900 as one illustrative embodiment.

FIG. 9 illustrates a method as another exemplary embodiment. In a first step 901 a first radio communications signal is received in a radio receiver, the first radio communications signal having a power control information portion and a first pilot symbol information portion. The first radio communications signal may in particular be a signal transmitted on a DPCCH channel in a UMTS network. The radio receiver may be a mobile radio receiver. In a second step 902 a signal-to-interference-and-noise ratio of the first radio communications signal is estimated on the basis of power control information bits in the power control information portion. In a third step 903 a synchronization status signal of the radio receiver with a radio transmitter is generated according to the signal-to-interference-and-noise ratio. The radio transmitter may be in one embodiment a base station in a UMTS network.

Figure 10:
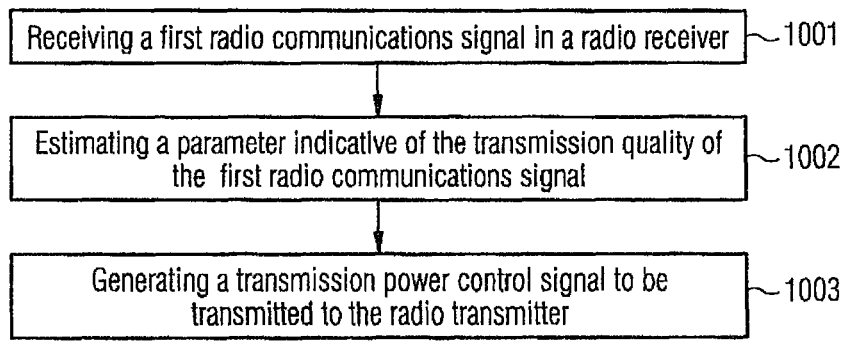
FIG. 10 schematically illustrates another method 1000 as one illustrative embodiment.

FIG. 10 illustrates a method as one exemplary embodiment. In a first step 1001 a first radio communications signal from a radio transmitter is received in a radio receiver, the first radio communications signal having a power control information portion and a first pilot symbol information portion. The first radio communications signal may in one embodiment be a signal transmitted on a DPCCH channel in a UMTS network. The radio receiver may be a mobile radio receiver. In a second step 1002 a parameter indicative of the transmission quality of the first radio communications signal is estimated on the basis of power control information bits in the power control information portion and on the basis of pilot symbol bits in the first pilot symbol information portion. In a third step 1003 a transmission power control signal to be transmitted to the radio transmitter is generated on the basis of the parameter. The transmission power control signal may in one embodiment include TPC information symbols transmitted in a DPCCH signal to a base station in a UMTS network.

Figure 11:
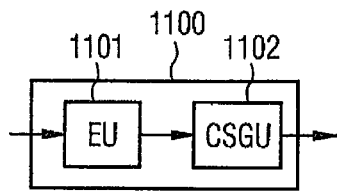
FIG. 11 schematically illustrates another device 1100 as one illustrative embodiment.

FIG. 11 schematically illustrates a device 1100 as one exemplary embodiment. The device 1100 may be used in a radio receiver, in particular a mobile radio receiver in a UMTS network. The device 1100 may include an estimation unit EU 1101 configured to estimate a parameter indicative of a transmission quality of a first radio communications signal having a power control information portion and a first pilot symbol information portion on the basis of power control information bits in the power control information portion and on the basis of pilot symbol bits in the first pilot symbol information portion. The system 1100 also comprises a control signal generation unit CSGU 1102 configured to generate a control signal for the radio receiver on the basis of the parameter.

Figure 12:
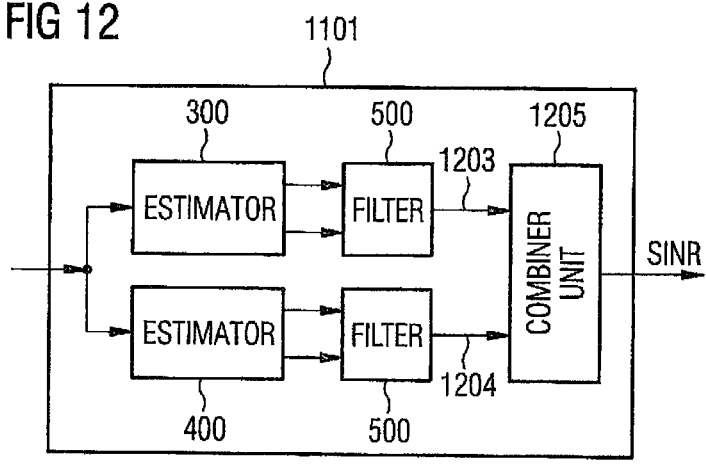
FIG. 12 schematically illustrates an implementation of the device 1101 shown in FIG. 11.
Figure 13:
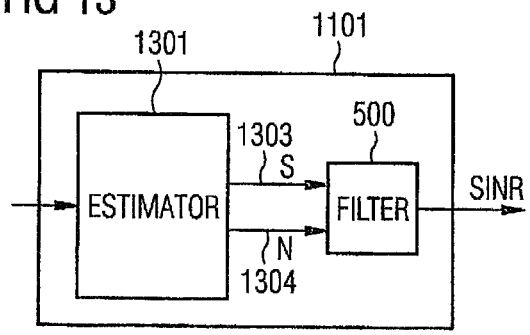
FIG. 13 schematically illustrates another implementation of the device 1101 shown in FIG. 11.

Referring to FIG. 11, according to a first embodiment, the device 1100 may be configured to output a control signal which comprises a synchronization status signal of the UE. In this case, the control signal generation unit CSGU 1102 outputs a synchronization status signal of the UE which may be derived from the output of the estimation unit EU 1101 as explained in conjunction with FIG. 1. The estimation unit EU 1101 may output an SINR which is based on TPC information bits and pilot bits. As a first embodiment, the estimation unit EU 1101 may be arranged according to FIG. 12, i.e. the SINR may be calculated by SINR-combining. This is, a first SINR based solely on TPC information bits may be computed by a combination of e.g. the devices 300 and 500 shown in FIGS. 3 and 5, respectively, and provided at output 1203, a second SINR based solely on pilot bits may be computed by a combination of e.g. the devices 400 and 500 shown in FIGS. 4 and 5, respectively, and provided at output 1204, and the first and second SINRs are then combined in a combiner unit 1205 according e.g. Eq. 15 to yield the output SINR of the estimation unit EU 1101. As a second embodiment, such SINR may be calculated according to FIG. 13, i.e. by signal power combining of TPC information bits and pilot bits (output 1303) and by noise power combining of TPC information bits and pilot bits (output 1304) in an estimator 1301, and by subsequently calculating the SINR from these combined signal power and noise power quantities. As an example, the estimator 1301 may be implemented by the estimator 600 shown in FIG. 6 or the estimator 700 shown in FIG. 7 to compute the combined signal power quantity S and the combined noise power quantity N. The SINR outputted by the estimation unit EU 1101 may, in this case, be computed by device 500 as shown in FIG. 5, however fed with the quantities S and N generated by the estimators 600 or 700.

Figure 14:
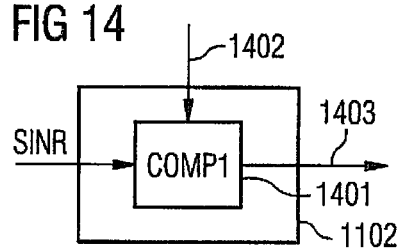
FIG. 14 schematically illustrates an implementation of the device 1102 shown in FIG. 11.

Still according to one embodiment, the control signal generation unit CSGU 1102 may have a comparator COMP1 1401 as shown in FIG. 14. The comparator 1401 may receive the SINR outputted by the estimation unit EU 1101 and channel quality threshold values such as e.g. $Q_{in}$ and/or $Q_{out}$ at input 1402. As explained above, depending on the comparison result, synchronization status quantities such as e.g. the CPHY-Sync-IND and CPHY-Out-of-Sync-IND primitives may be generated and provided at output 1403.

Figure 15:
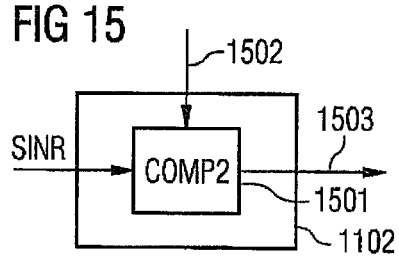
FIG. 15 schematically illustrates another implementation of the device 1102 shown in FIG. 11.

Further referring to FIG. 11, according to another embodiment, the device 1100 may be configured to output a transmission power control signal. In this case, the control signal generation unit CSGU 1102 may output an uplink TPC information signal which is transmitted to the base station and used in the base station to control the power of the downlink signal transmitted from the base station to the UE. As shown in FIG. 15, such control signal may be derived by comparing a measured SINR value outputted by the estimation unit EU 1101, or a BER or BLER value based on the measured SINR value, with a target SINR value or target BER or BLER values, respectively, in a comparator COMP2 1501. The target SINR value or target BER value or target BLER value is fed into the comparator 1501 at input 1502. As explained above, depending on the comparison result, TPC commands such as e.g. the DLPC-TPC bits may be generated and provided at output 1503 of the comparator 1501. Embodiments of the estimation unit EU 1101 may e.g. be configured the same way as explained above for the embodiment in conjunction with FIGS. 12 and 13.

Figure 16:
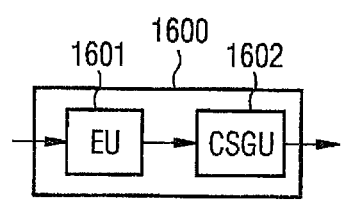
FIG. 16 schematically illustrates another device 1200 as one illustrative embodiment.
Figure 17:
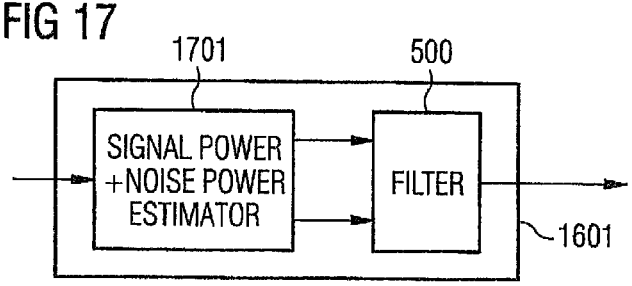
FIG. 17 schematically illustrates an implementation of the device 1601 shown in FIG. 16.

FIG. 16 schematically illustrates a device 1600 as one exemplary embodiment. The device 1600 may be used in a radio receiver, in particular a mobile radio receiver in a UMTS network. The device 1600 may include an estimation unit 1601 configured to estimate a signal-to-interference-and-noise ratio of a first radio communications signal having a power control information portion on the basis of power control information bits in the power control information portion and a control signal generation unit 1602 configured to generate a synchronization status signal of the radio receiver with a radio transmitter according to the signal-to-interference-and-noise ratio. The radio transmitter may in particular be a base station in a UMTS network. In this case, a synchronization status signal may be calculated solely on the basis of TPC bits, of which, however, the soft-bit information is exploited. Again, in this case, the control signal generation unit CSGU 1602 outputs a synchronization status signal of the UE which may be derived from the output of the estimation unit EU as explained in conjunction with FIG. 1. According to FIG. 17, the estimation unit EU 1601 may compute the output SINR e.g. by combining a signal power and noise power estimator 1701 operating solely on TPC information bits and the device 500 as shown in FIG. 5. The signal power and noise power estimator 1701 may be implemented by the device 300 shown in FIG. 3 or by the device 400 shown in FIG. 4, if device 400 is adapted to TPC input bits.

What is claimed is:

1. A method, comprising:
receiving a first radio communications signal in a radio receiver, the first radio communications signal having a power control information portion and a first pilot symbol information portion;
estimating a parameter indicative of the transmission quality of the first radio communications signal on the basis of power control information bits in the power control information portion and on the basis of pilot symbol bits in the first pilot symbol information portion, wherein estimating the parameter comprises
determining complex channel weight estimates by multiplying of the power control information bits with a predetermined series of reference power control information bits, the series of reference power control information bits being set to a series of +1 bits or to a series of −1 bits; and
determining at least one of a signal power and a noise power of the power control information bits from the channel weight estimates.

2. The method of claim 1, wherein a control signal comprises a synchronization status signal of the radio receiver with a radio transmitter.

3. The method of claim 1, further comprising:
determining a first signal-to-interference-and-noise ratio on the basis of the power control information bits;
determining a second signal-to-interference-and-noise ratio on the basis of the pilot symbol bits; and
estimating the parameter by combining the first signal-to-interference-and-noise ratio and the second signal-to-interference-and-noise ratio.

4. The method of claim 1, further comprising:
receiving a second radio communications signal having a second pilot symbol information portion in the radio receiver;
estimating the parameter additionally from the pilot symbol bits in the second pilot symbol information portion.

5. The method of claim 1, further comprising:
comparing the parameter with upper or lower threshold values, or both, of the transmission quality; and
generating a control signal for the radio receiver on the basis of a result of the comparison.

6. The method of claim 4, wherein the first radio communications signal comprises a signal associated with a downlink dedicated physical channel and the second radio communications signal comprises a signal associated with a downlink common pilot channel.

7. A method, comprising:
receiving a first radio communications signal in a radio receiver, the first radio communications signal having a power control information portion and a first pilot symbol information portion;
determining complex channel weight estimates by multiplying power control information bits with a predetermined series of reference power control information bits, the series of reference power control information bits being set to a series of +1 bits or to a series of −1 bits; and
determining at least one of a signal power and a noise power of the power control information bits from the channel weight estimates.

8. A method, comprising:
receiving a first radio communications signal from a radio transmitter in a radio receiver, the first radio communications signal having a power control information portion and a first pilot symbol information portion;
estimating a parameter indicative of the transmission quality of the first radio communications signal on the basis of power control information bits in the power control information portion and on the basis of pilot symbol bits in the first pilot symbol information portion, comprising:
determining complex channel weight estimates by multiplying the power control information bits with a predetermined series of reference power control information bits, the series of reference power control information bits being set to a series of +1 bits or to a series of −1 bits;
determining a first quantity indicative of a signal power of the first radio communications signal on a basis of the channel weight estimates;
determining a second quantity indicative of a noise power of the first radio communications signal on a basis of the channel weight estimates;
determining a third quantity indicative of a signal power of the first radio communications signal on a basis of the pilot symbol bits in the first pilot symbol information portion;
determining a fourth quantity indicative of a noise power of the first radio communications signal on a basis of the pilot symbol bits in the first pilot symbol information portion;
wherein estimating the parameter on the basis of the power control information bits and the pilot symbol bits further comprises estimating the parameter as a signal-to-interference-and-noise ratio of the first radio communications signal on a basis of the first, second, third and fourth quantities; and
generating a transmission power control signal to be transmitted to the radio transmitter on the basis of the parameter.

9. The method of claim 8, wherein the transmission power control signal comprises downlink transmission power control bits.

10. The method of claim 8, further comprising:
receiving a second radio communications signal from the radio transmitter in the radio receiver, the second radio communications signal having a second pilot symbol information portion; and
estimating the parameter additionally on the basis of the pilot symbol bits in the second pilot symbol information portion.

11. The method of claim 10, wherein the first radio communications signal comprises a signal associated with a downlink dedicated physical channel and the second radio communications signal comprises a signal associated with a downlink common pilot channel.

12. A device to be used in a radio receiver, comprising:
an estimation unit configured to estimate a parameter indicative of a transmission quality of a first radio communications signal having a power control information portion and a first pilot symbol information portion on the basis of power control information bits in the power control information portion and on the basis of pilot symbol bits in the first pilot symbol information portion;
a control signal generation unit configured to generate a control signal for the radio receiver on the basis of the parameter, wherein the estimation unit comprises:
a processing unit configured to determine complex channel weight estimates by multiplying the power control information bits with a predetermined series of reference power control information bits, the series of reference power control information bits being set to a series of +1 bits or to a series of −1 bits;
a first signal power estimation unit configured to estimate a first quantity indicative of a signal power of the first radio communications signal on a basis of the channel weight estimates;
a first noise power estimation unit configured to estimate a second quantity indicative of a noise power of the first radio communications signal on a basis of the channel weight estimates;
a second signal power estimation unit configured to estimate a third quantity indicative of a signal power of the first radio communications signal on a basis of the pilot symbol bits in the first pilot symbol information portion;
a second noise power estimation unit configured to estimate a fourth quantity indicative of a noise power of the first radio communications signal on a basis of the pilot symbol bits in the first pilot symbol information portion; and
a second computation unit configured to compute the parameter on the basis of the first, second, third and fourth quantities.

13. The device of claim 12, wherein the control signal generation unit is configured to generate a synchronization status signal of the radio receiver with a radio transmitter as the control signal on the basis of the parameter.

14. The device of claim 12, wherein the control signal generation unit is configured to generate a transmission power control signal to be transmitted to a radio transmitter as the control signal on the basis of the parameter.

15. The device of claim 12, wherein the estimation unit comprises:
- a first transmission quality estimation unit configured to estimate a first parameter indicative of the transmission quality of the first radio communications signal on the basis of the power control information bits in the power control information portion;
- a second transmission quality estimation unit configured to estimate a second parameter indicative of the transmission quality of the first radio communications signal on the basis of the pilot symbol bits in the first pilot symbol information portion; and
- a first computation unit configured to compute the parameter on the basis of the first parameter and the second parameter.

16. The device of claim 12, further comprising:
- a third noise power estimation unit configured to estimate a fifth quantity indicative of the noise power of pilot symbol bits of a second radio communications signal, wherein the second computation unit is configured to compute the parameter additionally on the basis of the fifth quantity.

17. The device of claim 16, wherein the first radio communications signal comprises a signal associated with a downlink dedicated physical channel and the second radio communications signal comprises a signal associated with a downlink common pilot channel.

18. The device of claim 16, further comprising:
- a first weighting unit having an output coupled to an input of the first signal power estimation unit and to an input of the first noise power estimation unit, the first weighting unit being configured to generate channel estimates of the transmission power control bits of the first radio communications signal; and
- a second weighting unit having an output coupled to an input of the second signal power estimation unit and to an input of the second noise power estimation unit, the second weighting unit being configured to generate channel estimates of the pilot symbol bits of the first radio communications signal.

19. A device to be used in a radio receiver, comprising:
- an estimation unit configured to estimate a signal-to-interference-and-noise ratio of a first radio communications signal having a power control information portion on the basis of power control information bits in the power control information portion; and
- a control signal generation unit configured to generate a synchronization status signal of the radio receiver with a radio transmitter according to the signal-to-interference-and-noise ratio, wherein the estimation unit is configured:
  - to determine complex channel weight estimates by multiplying the power control information bits with a predetermined series of reference power control information bits, the series of reference power control information bits being set to a series of +1 bits or to a series of −1 bits; and
  - to determine at least one of a signal power and a noise power of the power control information bits from the channel weight estimates.

20. The device of claim 19, wherein the first radio communications signal comprises a signal associated with a downlink dedicated physical channel.

21. The method of claim 1, wherein the parameter is estimated on the basis of soft bits, the soft bits carrying reliability information of the power control information bits.

22. The method of claim 21, further comprising:
- mapping the soft bits to hard decision bits by applying a threshold to the soft bits, wherein a hard decision bit is set to 1 if a soft bit carrying the reliability information of a respective power control bit is less or equal than zero and wherein a hard decision bit is set to −1 if the soft bit is greater than zero.

23. The method of claim 22, further comprising:
- deriving a majority decision bit by accumulating the hard decision bits, wherein the majority decision bit is set to 1 if the accumulated hard decision bits are greater than zero and is set to −1 if the accumulated hard decision bits are less than or equal to zero.

24. The method of claim 23, further comprising:
- deriving an error rate of the power control information portion by comparing a number of the hard decision bits not matching the majority decision bit against a total number of the hard decision bits.

25. The method of claim 21, further comprising:
- deriving an error rate of the power control information portion from establishing a signal-to-interference-and-noise ratio of the soft bits by using the reliability information of each of the soft bits.

26. The method of claim 1, wherein the parameter comprises a signal-to-interference-and-noise ratio.

27. The method of claim 7, further comprising:
- determining a first quantity indicative of the signal power of the first radio communications signal on the basis of power control information bits in the power control information portion;
- determining a second quantity indicative of the noise power of the first radio communications signal; and
- estimating a signal-to-interference-and-noise ratio on the basis of the first quantity and the second quantity.

28. The method of claim 1, wherein a length of the series of reference power control information bits corresponds to a length of the power control information portion.

29. The method of claim 1, wherein all the bits of the series of reference power control information bits are identical.

30. The method of claim 1, wherein the determining the channel weight estimates comprises multiplying the power control information bits by a complex conjugate of the series of reference power control information bits.

31. The method of claim 1, wherein the determining the channel weight estimates comprises:
- bit-wise multiplying the power control information bits by a complex conjugate of the series of reference power control information bits;
- adding results of the bit-wise multiplication; and
- dividing a result of the addition by a length of the power control information portion.

* * * * *